United States Patent [19]

Jorgensen

[11] 4,107,800

[45] Aug. 22, 1978

[54] COMBINATION DRILLING AND WRENCHING TOOL

[75] Inventor: Arne Roy Jorgensen, Lombard, Ill.

[73] Assignee: Illinois Tool Works Inc., Chicago, Ill.

[21] Appl. No.: 806,030

[22] Filed: Jun. 13, 1977

[51] Int. Cl.² ........................................... B26B 11/00
[52] U.S. Cl. ..................................... 7/158; 81/52.4 R
[58] Field of Search ...................... 7/1 G, 14.1 R, 1 R,
7/138, 158; 145/50 B, 61 R, 116 R; 81/52.4 R,
52.4 A, 54, 121 R, 121 B; 144/32 R

[56] References Cited

U.S. PATENT DOCUMENTS

| | | | |
|---|---|---|---|
| 2,796,161 | 6/1957 | Graybill | 81/52.4 R X |
| 3,336,611 | 8/1967 | Schepp | 7/14.1 R |
| 3,965,510 | 6/1976 | Ernst | 7/14.1 R |
| 4,030,383 | 6/1977 | Wagner | 81/54 |

Primary Examiner—James L. Jones, Jr.
Assistant Examiner—James G. Smith
Attorney, Agent, or Firm—Thomas W. Buckman; Robert W. Beart

[57] ABSTRACT

An improvement in a screw setting implement of the type incorporated in a combination drilling and driving tool which includes a sleeve surrounding screw head-receiving, torque-inducing surfaces. The sleeve forms an axial recess extending outwardly from the torque-inducing surfaces to enable the threaded fastener to be seated without overtorquing. The improvement in the invention comprising means for adjusting the length of the axial recess.

6 Claims, 9 Drawing Figures

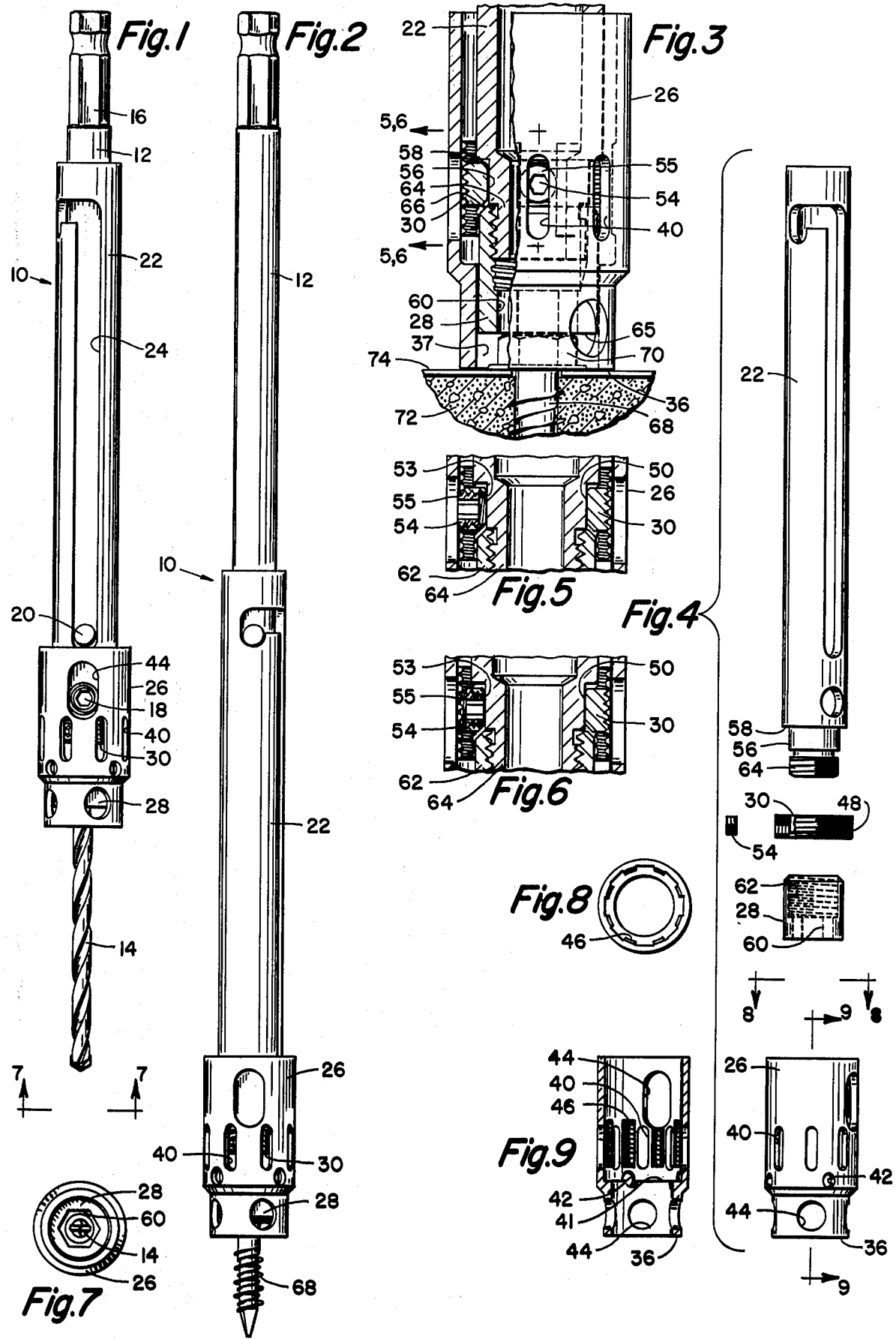

COMBINATION DRILLING AND WRENCHING TOOL

This invention relates generally to a combination tool which may be selectively utilized to either drill a hole or threadingly associate a screw member in a hole. The invention more particularly relates to an improvement to a means on the tool designed to prevent the fastener from being overtorqued.

A tool of the general type described is typified in U.S. Pat. No. 3,965,510. The combination drilling and driving tool described in the patent incorporates an axial recess, formed by a sleeve, extending forwardly of the screw-head receiving socket and adapted to contact the work surface to cause the screw to be drawn out of contact with the wrenching socket means as the head approaches the work surface. The recess is described as being an axial length equal to the height of the head being driven so that torque to the fastener is automatically stopped when the fastener seats on the workpiece.

While drilling and driving tools of this type and screwdriving nosepieces with such depth-sensitive recesses do function satisfactorily, there are still a number of applications which require a more versatile tool. For example, certain construction applications may require that a single tool be used with a variety of head styles and heights of heads of screw. Certain other fastener applications may involve the drilling of a hole and the placement of a screw anchor in the hole where a fixture or structure is closely adjacent to the hole. In such situations, the prior art fixed depth-sensitive nosepiece would contact the obstruction or fixture rather than the surface of the workpiece and thereby cause the anchor to disengage from the torque-inducing surfaces before the anchor is tight against the work surface.

It is, accordingly, a primary object of the invention to provide an easily but accurately adjustable depth sensing sleeve to an automatic torque disengaging feature on a screw driving tool.

It is still another object of the invention to provide a depth-sensing sleeve which can both be manipulated to be either axially adjustable or free to rotate relative to the torque-inducing surfaces without changing relative axial location.

Principal features of this invention leading to the fulfillment of the above and other objects and advantages include the mounting of a discrete sleeve member on and surrounding a cylindrical body so as to be capable of extending axially beyond wrenching surfaces formed in the associated extremity of the body. The mounting means will consist primarily of a ring having threads formed on its outer surface for engagement with threads formed on the inner peripheral sleeve surface. A setscrew is provided in the wall of the ring to adapt the ring to either be securely clamped to the body, thus free to threadingly rotate relative to the sleeve for adjustment purposes, or be securely clamped to the sleeve, thus free to rotate in cooperation with the sleeve during the drilling and/or driving operation.

BRIEF DESCRIPTION OF THE DRAWINGS

FIG. 1 is a side elevational view of a tool, incorporating the features of the invention, shown in a drilling mode.

FIG. 2 is a side elevational view of a tool, incorporating the features of this invention, shown in a fastener driving mode.

FIG. 3 is an enlarged elevational view, in partial section, of the nose region of the tool in operation driving a fastener into a workpiece.

FIG. 4 is an exploded view of the combination tool illustrating the nosepiece elements of the invention.

FIG. 5 is a cross-sectional view, as taken along lines 5—5 of FIG. 3, illustrating the clamping of the sleeve mounting ring to the sleeve during the driving mode of the invention.

FIG. 6 is a cross-sectional view, similar to that taken along lines 5—5 of FIG. 3, but illustrating the clamping of the sleeve mounting ring to the body during the adjustment mode of the invention.

FIG. 7 is an end view of the tool embodying the features of the invention as taken in the direction of lines 7—7 of FIG. 1.

FIG. 8 is a top end view of the sleeve embodied in the invention and as taken in the direction of lines 8—8 of FIG. 4.

FIG. 9 is a longitudinal cross-sectional view of the sleeve as taken along lines 9—9 of FIG. 4.

DESCRIPTION OF THE PREFERRED EMBODIMENTS

Turning first to FIGS. 1 and 2, a composite tool 10 embodying the features of the invention will be shown to include basically a cylindrical mandrel 12, having a drill bit 14 releasably secured at one extremity, and torque-applying surfaces 16 formed in the other extremity. The drill will be secured with a setscrew 18 permitting it to be removed and replaced whenever necessary. The mandrel is telescopically associated within a cylindrical body 22. The mandrel will include a lug-type protuberance 20 received in a longitudinally extending, hook-shaped slot 24 in the body. The slot and lug cooperation permits rapid conversion from the drilling mode of the tool shown in FIG. 1 to the fastener driving mode of the tool shown in FIG. 2. It should be noted that the cooperation between the lug and the channel transfers the torque from a torque energy source, such as a hand held electric drill (not shown), associated with surfaces 16 to the body 22.

The nose area of the combination tool includes a socket-type screwhead wrenching member 28 with a sleeve 26 surrounding member 28. The sleeve member 26, incorporating the depth sensing features of the invention, is adjustably mounted, in a manner to be described in detail later herein, to the body by a thrust ring 30.

It will be noted with reference to FIG. 3 that the sleeve creates an axial recess 37 extending beyond the forward extremities of the socket 28. Such a recess in a drilling and driving tool of the type described and more particularly of the type used primarily in masonry or concrete is an important concept. When a hole of the proper depth has been drilled in a primary workpiece such as a masonry structure 72 with the drill bit 14, the mandrel holding the drill is retracted as shown in FIG. 2 so that the head of a screw-type fastener 68 can be inserted in the socket-type wrenching surfaces 60 at the nose of the body. As the fastener is driven, as shown in FIG. 3, the front surface 36 of the sleeve abuts the work surface 74. At this point, further rotation of the fastener head 70 will produce the appropriate axial advance of the screw to the point where there is no further contact between the head and the wrenching surfaces. At this point, obviously, the axial advance of the screw stops. This concept is very important in the threading of a screw-type fastener in a bore in masonry-type structures since overtorquing of the fastener will tend to strip the threads formed in the concrete bore by the fastener.

Attention is now drawn to the exploded view of FIG. 4 with continuing reference to FIG. 3 showing the details of the elements making up the adjustable nosepiece of the invention. The nosepiece extremity of the body 22 includes a threaded stub end 64 with an unthreaded, short, cylindrical shank recess region 56 defined intermediate the stud end and a shoulder 58. A mounting, thrust ring 30 is seated on the cylindrical shank surface 56 and retained from axial movement relative to the body by shoulder 58 and the upper edge 66 of the socket 28. Socket 28 is threadedly associated with the threaded stub 64 by a threaded bore 62 at its upper extremity. The lower, internal, extremity of the socket includes the torque-inducing surfaces 60, shown herein as a hex configuration, but obviously not limited to such a configuration.

While the bore or inner periphery 50 of the ring is a smooth cylindrical surface complementary to shank surface 56, the outer peripheral surface of the ring includes a helical thread configuration 48. A threaded aperture 52 is formed in the wall of the ring within which an internal drive, headless setscrew 54 is associated. The setscrew will be of a length substantially equal to the thickness of the wall of the ring for purposes to be described later. The depth-sensitive sleeve 26 is thus threadingly associated with the mounting ring 30 by a mating internal thread configuration 46. In order to assemble the sleeve to the body, the setscrew 54 is tightened into clamping engagement with the surface 56 on the body and the sleeve is then telescopically and threadingly secured to the body.

Having observed the various elements making up the invention, attention may now be directed to the manner in which the sleeve is adjusted so as to vary the height of the recess 37, defined by the distance between the workpiece engaging front surface 36 of the sleeve and the lowermost extremity surfaces 65 of the socket 28. The recess 37 is adjusted by first securing the ring on the body by rotating the screw inwardly bringing inner surface 53 of the screw into clamping engagement with ring receiving surface 56 preventing relative rotation of the ring and the body as shown in FIG. 6. The clamping setscrew 54 will preferably be aligned with a feature on the body, such as drill attachment aperture 18, to define a reference location for the accurate adjustment of the sleeve. It will be noted that the sleeve includes a plurality of equally spaced elongated slots 40 in the vicinity of the internal thread configurations 46. The thread configurations are formed as a plurality of longitudinal strips of threads cooperating to provide a discontinuous helix capable of accepting the helix 48 on the external surface of the ring 30. The sleeve 26 is rotated until the desired spacing between the surface 36 of the sleeve and the socket 28 is attained. The sleeve is then slightly rotated further so the setscrew is aligned with the closest slot 40. Having thus achieved the closest adjustment to the desired axial recess, the setscrew is rotated outwardly to bring upper surface 55 into clamping engagement with the marginal surfaces of the associated slot 40 as shown in FIG. 5. The ring and sleeve will therefore be joined preventing further threading rotating but permitting the ring and sleeve combination to rotate about the axis of the tool on bearing surface 56. An upper shoulder 58 on the body and the upper surface 66 of the socket member define a recess within which the ring will rotate without changing axial position.

The socket 28 is internally threaded with thread of the same hand as the fastener intended to be driven. The threaded coupling between the threads 62 in the upper region of the bore of the socket and the threaded stub shank 64 facilitates the interchangeability of sockets for a variety of sizes of screw heads.

Obviously, the number of circumferentially spaced elongated slots 40 determine the accuracy at which the desired recess depth can be obtained. The preferred embodiment utilizes eight equally spaced slots with the coupling between the ring 30 and sleeve 26 utilizing 11/16 diameter, 24 NEF threads which produces 0.005 in. sleeve adjustment with each ⅛ turn.

Since the primary purpose of a tool of the type described is to assist the drilling of a hole in masonry and the setting of a fastener therein, the design of the tool must consider the harmful effects of masonry dust. Such dust and particles tend to become lodged and packed in the nosepiece area of the tool. Large apertures 44 adjacent the workpiece abutting surface 36 facilitate the removal of dust in that area. Smaller holes 42 adjacent the juncture of the large diameter portion of the sleeve and the smaller diameter lower region facilitate the exit of dust material from the shelf 41.

Large access aperture 44 permits a tool to manipulate setscrew 18 to remove or replace the drill bit 14.

Thus it is apparent that there has been provided, in accordance with the invention, an adjustable nosepiece for a screw setting tool that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. In a tool for securing a screw fastener including, in combination, a body with a driving member located at one extremity for receiving the head of an associated screw fastener, the driving member comprising surfaces adapted to transmit torque to said head, a sleeve member surrounding the torque transmitting surface comprising inner wall portions spaced radially from the torque transmitting surfaces so as to prevent torque transmitting contact between the associated fastener head and the sleeve, means for securely, but axially, adjustably mounting the sleeve member on the body so that the relative axial locations of the torque transmitting surfaces and workpiece engageable end surfaces of the sleeve may be readily varied, the mounting means comprising a ring member surrounding the body and including a helical thread configured on the outer surface thereof and a substantially cylindrical surface comprising the inner periphery adapted to rotate freely on a mating cylindrical surface of the body, the sleeve member including an internal thread configuration cooperating with the thread on the ring thereby adapted to selectively axially move the sleeve relative to the body, the body including abutment surfaces on either side of the mating cylindrical surface retaining the ring member from axial movement relative to body, means cooperating with the body, sleeve and ring to selectively clamp the ring into nonrotative position relative to the mating cylindrical surface during adjustment modes of the sleeve and relative to the sleeve during operative modes of the tool.

2. The tool of claim 1, including an aperture through the wall of the ring member, an internal drive, headless setscrew threadingly associated with said aperture and axially dimensioned so as to either clamp the ring from rotation relative to body or relative to sleeve.

3. The tool of claim 2, wherein the sleeve member includes a plurality of longitudinally extending slots equally spaced about the periphery of the sleeve and in the axial location of the internal threads of the sleeve permitting access to the setscrew for threading manipulation thereof, wherein an inward threading of the setscrew into clamping engagement with the body permits the sleeve to threadingly rotate relative to the ring and the body causing the sleeve to be axially adjusted relative to the wrenching socket while an outward threading of the setscrew into clamping engagement with the sleeve permits the sleeve and ring to rotate together relative to the body and wrenching surfaces during operative association with a screw-type fastener.

4. The tool of claim 1, wherein the wrenching socket means includes means to removably secure said socket means in non-rotative relationship with said body.

5. The tool of claim 1, wherein the sleeve includes means permitting egress of concrete dust or the like from first ectremity of the body.

6. The tool of claim 1, including a rotable mandrel with a first extremity including a drill bit in coaxial arrangement therewith and the second extremity incorporating the driving member, the body telescopically and slidably mounted on the mandrel.

* * * * *